Patented Mar. 1, 1927.

1,619,267

UNITED STATES PATENT OFFICE.

HUGH K. MOORE, OF BERLIN, NEW HAMPSHIRE, ASSIGNOR TO BROWN COMPANY, OF BERLIN, NEW HAMPSHIRE, A CORPORATION OF MAINE.

METHOD OF PRODUCING CALCIUM ARSENATE.

No Drawing. Application filed February 14, 1925. Serial No. 9,352.

The object of this invention is to provide a finely-divided calcium arsenate free from arsenite and from soluble arsenates.

It has been found that calcium arsenate is of great value in the destruction of the boll weevil, but that, if this substance be contaminated with arsenite or soluble arsenates, the plants treated therewith are injured.

In the commercial production of insoluble calcium arsenate the processes which have been practiced have either been expensive or have resulted in the production of a product which is injurious to the plant. I have discovered that it is possible commercially to produce calcium arsenate, in a form adapting it for use in the treatment of cotton plants for the destruction of the boll weevil, by a process in which the formation of arsenites or soluble arsenates is avoided and in which I am able to obviate the necessity of employing valuable products which must subsequently be either destroyed or wasted or else recovered with additional expense.

Among the requirements for commercial arsenate is that it shall be practically free from soluble arsenates or arsenites. The limit of tolerance is .75% of soluble arsenate. There are many soluble arsenates, a few of which are sodium meta-arsenate, sodium arsenate, hydrogen disodium arsenate, dihydrogen sodium arsenate, tetrahydrogen calcium arsenate, dihydrogen calcium arsenate, tetrasodium calcium arsenate, disodium dicalcium arsenate and several hydrogen sodium calcium arsenates. These are but a few of the soluble arsenates which could be mentioned. It is, therefore, necessary to conduct the process of producing calcium arsenate in such manner that these soluble arsenates or the corresponding soluble arsenites shall not appear in the final product. If these soluble arsenates or arsenites are formed, they must be removed by washing, which of course occasions a great waste of arsenate. The solution of this problem of producing a commercial calcium arsenate is found in the method by which a minimum amount of soluble arsenate is formed, and consequently waste is avoided.

I have discovered that it is possible to put arsenious oxide into an aqueous solution with a minute amount or proportion of caustic soda and that apparently arsenious acid and sodium meta-arsenite present in the solution acts as a catalyzer in this operation. Ordinarily, in the formation of arsenious acid, the proportion of caustic soda to arsenious oxide is very high; whereas I have discovered that, by employing what may be regarded as a minute quantity of caustic soda, arsenious oxide may be dissolved in water with the formation directly of arsenious acid. As a further step in the process, by the utilization of bleach liquor which furnishes nascent oxygen for oxidation (calcium oxychloride or other suitable oxidizing agent) together with calcium hydroxide, it is possible to form insoluble calcium arsenate (without the production of appreciable soluble arsenates or arsenites) which may be recovered and dried in a finely-divided or powdered form.

As an example of a method of carrying out the various steps of the process which is performed at atmospheric pressures. I will describe a method of procedure which will produce the desired results. I first place in an open container about 2245 parts by weight of boiling water, and add thereto 200 parts by weight of arsenious oxide and 3 parts by weight of caustic soda. The container is kept at a temperature sufficient to prevent crystallization of meta-arsenious acid,—approximately 210° F. This proportion is not essential as a smaller amount of caustic soda will produce the desired results, although a longer time of solution is required. As a result of this procedure, there is formed arsenious acid, probably containing a small quantity of sodium meta-arsenite. The above-described process will be dependent upon the size of the mixing tank as compared to the other tanks in the operation. Reducing the amount of caustic soda from 3 parts, in the example given, slows the reaction down and the limit is reached where the time and steam consumed offset the advantages due to the lessened use of caustic soda. The batch is withdrawn from the tank and kept at a temperature sufficient to maintain the arsenious acid in solution, for arsenious acid once crystallized out is exceedingly difficult, if not impossible, to dissolve in water.

The solution of arsenious acid is now ready for treatment with lime for the formation of insoluble calcium arsenate. I have found, as previously stated, that by using bleach liquor as the oxidizing agent in an aqueous solution containing calcium hydroxide, calcium arsenate may be formed without the formation of appreciable quantities of either calcium arsenite or the soluble arsenates, such as tetrahydrogen calcium arsenate or dicalcium hydrogen arsenate, tetrasodium calcium arsenate, disodium calcium arsenate, hydrogen calcium arsenate, and other soluble arsenates or arsenites.

I place in a container, provided with an agitator which may be driven at relatively high speed, a quantity of milk of lime and of bleach liquor in the proportion of about 174 parts of active lime and about 254 parts of calcium oxychloride ($CaOCl_2$), and at the same time in a separate container there is provided a solution of the arsenious acid containing 198 parts of arsenious oxide (99%). The mixture of milk of lime and bleach liquor is subjected to rapid and continuous agitation, and then the arsenious acid solution is gradually fed to the rapidly changing surface of the agitated mass in the form of fine droplets as by means of a spraying or atomizing nozzle.

I regard it as important that the arsenious acid solution be added to the mixture in a very finely-divided state, and preferably covering a large surface of the agitated mixture, for reasons which I will now explain.

Calcium hydroxide is soluble in water to only a very limited extent, so that, when milk of lime is formed, only a relatively small proportion of the calcium hydroxide goes into solution. The bleach liquor as commercially produced contains $CaOCl_2$. Now as a result of the gradual addition of the finely-divided arsenious acid solution, the arsenious acid reacts with the calcium hydroxide and $CaOCl_2$ with the formation of tricalcium arsenate. This reaction may be expressed as follows:

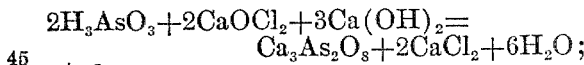

or else

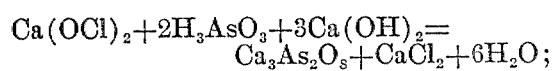

or else

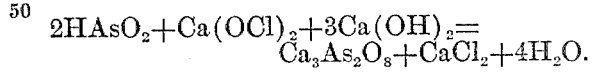

Other reactions may occur. If, however, the arsenious acid solution were added in a large quantity instantaneously into the mixture of milk of lime and bleach liquor, there would be formed particles or granules containing either lime or calcium arenite or both as the core, the surface of which would be covered with calcium arsenate. Since calcium arsenite is itself insoluble in water or in a calcium oxychloride, or a calcium chloride solution, the granules or particles thus formed would be permanently covered with the calcium arsenate, and bleach liquor will not diffuse through this coating. It has been found, however, that when the cotton plant is treated with a product which is apparently calcium arsenate but which in reality consists of particles of calcium arsenite coated with calcium arsenate, the exudation of the cotton plant has the effect of dissolving to some extent the calcium arsenate, thus exposing the core which burns and injures the plant. It is therefore important that the arsenious acid solution should be added to the mixture of milk of lime and bleach liquor in such way that it will react only with the calcium hydroxide which is in solution. By reason of the rapid agitation to which the mixture is subjected, there is constantly brought to the surface fresh calcium hydroxide in solution for reaction with the arsenious acid. As the calcium hydroxide in solution is removed by combination with arsenious acid in the form of a precipitate of tricalcium arsenate, calcium hydroxide in suspension dissolves to take its place. After the entire amount of arsenious acid solution has been supplied to the mixture of calcium hydroxide and bleached liquor, the mass is then subjected to a washing process by decantation, although it may be done by filtration. The final washing may be done by filtration. The calcium arsenate is in any case finally separated by filtration. Preferably this is carried on by means of a continuous filter, of, say, the Oliver type, in which the precipitate may be squeezed dry by rolls or flappers before its removal by a doctor from the filter. The precipitate, calcium arsenate, which is removed from the filter, if necessary, may be again washed to remove any soluble calcium chloride, and the precipitate is dried in a drying apparatus from which it is delivered into a pulverizing machine so that the required fineness can be obtained.

It is desirable that the mixture of bleach liquor and calcium hydroxide should preferably contain an excess of bleach liquor and more than the theoretical quantity of active lime to form calcium arsenate. The mixture may be tested to ensure that the desired condition prevails, any of the usual tests for this purpose being available. After the arsenious acid has been added to the batch in the container, the mass is subjected to continued agitation for some time, say an hour or more, water being added for dilution if the mass is too thick for proper agitation. Then, to ensure that there shall be no formation of soluble arsenates, the mass is tested after the completion of the agitating operation, and, if it be found that there is an insufficient quantity of lime or an insufficient quantity of bleach, the one or the other is added and the agitation is further continued for a time to cause any arsenic acid or acid calcium arsenates present to combine as tricalcium arsenate. In any event, however, care should be exercised to ensure that at all times there is a slight excess of bleach liquor and an excess of active lime.

In the example herein recited, I have mentioned the use of milk of lime which of course comprises lime-water and lime in suspension, but obviously I may employ only lime in solution, as lime-water, thereby avoiding the presence of discrete impurities. By use of either lime-water or milk of lime, and otherwise following the procedure described, one may produce tricalcium arsenate free from all but traces of arsenites or soluble arsenates.

By forming the arsenious acid as herein described and then adding it directly to the mixture of lime and bleach liquor, I am able to dispense with many of the steps which have heretofore been necessary in the formation of even impure calcium arsenate, such for example as the recovery of caustic soda, at least one filtration, and several washings.

While the reaction of calcium hypochlorite and arsenious acid is already known, there are some important steps to be performed to carry out a process industrially. With the ordinary method of making tricalcium arsenate, the product obtained is formed in such manner that it does not precipitate readily, and the product does not filter readily. Consequently, it is with difficulty that the product can be washed free from calcium chloride or soluble arsenate and from soluble arsenites (if there be any). I have discovered that, by making a hypochlorite solution of the proper strength, which strength is dependent upon the temperature of the water available, the reaction can be carried on so that there is obtained a product which precipitates and settles readily. The combination of arsenious acid, bleach and lime produces heat, and this heat can be advantageously utilized in obtaining a product which can be settled, filtered and washed. If the reaction is carried on below 90° F., the product will have all the previously described disadvantages. The temperature, at which the reaction should be carried on, is preferably between 90° and 110° F., although the reaction may proceed up to as high a temperature as 130° F. However, if the reaction proceeds at a temperature much above 110° F., there is liable to be a loss of hypochlorite due to its conversion by heat into calcium chloride and calcium chlorate. Calcium chlorate does not unite with arsenious acid and oxidize the same to arsenic acid, nor does it oxidize the salts or arsenious acid to the salts of arsenic acid under the conditions herein stated. As the temperature increases from 110° F. to 130° F., the losses become greater and greater, and at about 130° F. the losses due to this cause are too great for economical operation, dependent upon the cost of calcium hypochlorite. Two methods can be observed in carrying out my process. The preferable method is to make the strength of the hypochlorite solution such that the proper temperatures, and no higher, will be reached during the reaction. This strength is dependent upon the temperature of water available in making the hypochlorite solution and the resulting temperature of said solution. The second method which may be utilized is to either cool the hypochlorite solution or take away excess heat of reaction above 110° F. by cooling the reaction products of calcium hypochlorite and arsenious acid. This latter, however, is difficult to accomplish, inasmuch as the reaction products are in the form of a very thick clabber, thus making it extremely difficult to extract the heat. It has been found that the calcium triarsenate made within the limits of temperature, namely from 90° F. to 130° F., will settle out very readily, and can be washed by decantation without the necessity of passing the same through a filter. It will be seen that, inasmuch as the calcium triarsenate must be washed substantially free from calcium chloride, the above reaction is of industrial importance.

Inasmuch as loss of heat by radiation may vary considerably with the size of the batches, it is unsafe to give figures in proportions. Bearing in mind that the conditions may vary according to the surface exposed by the container tanks, it may be said that, if there be added to 148,000 pounds of bleach solution at 80° F. (containing 1350 pounds of available chlorine and 1800 pounds of free lime of which 85% is active lime) 22,000 pounds of arsenious acid solution at 210° F. (containing 1800 pounds of arsenious oxide) so that there is a final mixture of 170,000 pounds, the temperature of the batch will rise from 80° F. to 110° F due to the reaction,—dependent, of course, upon the shape of the tank, the area of exposed surfaces, and the prevailing atmospheric temperature. In the example a mill temperature of about 65° F. is assumed.

Arsenious oxide may be treated with bleach liquor containing only one-third the theoretical quantity of slaked lime with water, with the probable formation of tetrahydrogen calcium arsenite, which will largely go into solution when water is added, and will be oxidized upon the addition of the bleach liquor. Lime is then added to convert the soluble arsenates into the insoluble tricalcium arsenates. This variant from the procedure first herein described is not as satisfactory, however, in results as the first described procedure.

I have herein described the formation of salts of calcium, but the process may be practiced for the production of arsenates of other metals; and again, while I have described the formation of the initial batch of arsenious acid by the employment of a small quantity of caustic soda, I may employ in lieu of caustic soda any other suitable alkali, in amounts corresponding to the molecular weights.

While the procedure hereinbefore described is preferable, nevertheless it may be varied without departing from the spirit and scope of my invention as defined in the claims.

So far as common or generic subject-matter is concerned, this is a continuation of my application Serial No. 687,372, filed January 18, 1924.

What I claim is:—

1. A process of forming calcium arsenate, which comprises forming arsenious acid by dissolving arsenious oxide with heat in water in the presence of a minute quantity of an alkali at a temperature sufficiently high to maintain substantially all the arsenious acid formed thereby in solution, then adding the arsenious acid solution thus produced, in finely divided state, to the constantly changing surface of an agitated mixture of calcium hydroxide in solution and bleach liquor, thereby producing calcium arsenate without the formation of arsenite or appreciable quantities of soluble arsenates.

2. A process of forming calcium arsenate, which comprises adding arsenious acid in finely-divided form to the constantly changing surface of a rapidly agitated mixture of calcium hydroxide in solution and bleach liquor.

3. A process of forming calcium arsenate, which comprises adding the arsenious acid in finely-divided form to the rapidly changing surface of an agitated mixture of calcium hydroxide in solution and bleach liquor, with the formation of calcium arsenate, removing and washing the calcium arsenate, and then drying the same in finely divided condition.

4. A process of forming calcium arsenate, which comprises forming arsenious acid by dissolving arsenious oxide in water in the presence of arsenious acid and a minute quantity of caustic soda, then adding the arsenious acid in finely-divided form to the constantly changing surface of an agitated mixture of calcium hydroxide in solution and bleach liquor, with the formation of calcium arsenate, maintaining in said mixture an excess of bleach liquor and more than the theoretical quantity of calcium hydroxide.

5. A process of forming calcium arsenate, which comprises adding arsenious acid in finely divided form to the constantly changing surface of a rapidly agitated liquor containing calcium hydroxide and an agent capable of furnishing nascent oxygen to react with the arsenious acid and calcium hydroxide to produce calcium arsenate.

6. A process of forming calcium arsenate, which comprises forming arsenious acid by dissolving arsenious oxide with heat in water in the presence of a minute quantity of an alkali at a temperature sufficiently high to maintain substantially all of the arsenious acid formed thereby in solution, then adding the arsenious acid solution thus produced in finely divided state to the constantly changing surface of a liquor containing calcium hydroxide and an agent capable of producing nascent oxygen to react with the arsenious acid and calcium hydroxide to produce calcium arsenate.

In testimony whereof I have affixed my signature.

HUGH K. MOORE.